United States Patent [19]
Harvey et al.

[11] Patent Number: 5,582,159
[45] Date of Patent: *Dec. 10, 1996

[54] CONDENSATE HANDLERS FOR MULTI-POISE FURNACE

[75] Inventors: Eric A. Harvey, Greenwood; Timothy J. Waterman, Carmel; Larry D. Rieke, Zionsville, all of Ind.

[73] Assignee: Carrier Corporation, Syracuse, N.Y.

[*] Notice: The term of this patent shall not extend beyond the expiration date of Pat. No. 5,320,087.

[21] Appl. No.: 336,186

[22] Filed: Nov. 8, 1994

Related U.S. Application Data

[63] Continuation-in-part of Ser. No. 180,877, Jan. 12, 1994, abandoned.

[51] Int. Cl.⁶ ........................................ F24H 3/02
[52] U.S. Cl. ............... 126/110 R; 126/116 R; 73/714
[58] Field of Search ............ 110/189, 148, 110/203; 126/110 R, 116 R; 73/706, 714, 756

[56] References Cited

U.S. PATENT DOCUMENTS

| | | | |
|---|---|---|---|
| 5,309,890 | 5/1994 | Rieke et al. | 126/110 R |
| 5,313,930 | 5/1994 | Kujawa et al. | 126/116 R |
| 5,320,087 | 6/1994 | Froman | 126/110 R |
| 5,322,051 | 6/1994 | Patterson et al. | 126/110 R |
| 5,324,194 | 6/1994 | Bruce et al. | 431/258 |
| 5,326,025 | 7/1994 | Dempsey et al. | 236/11 |
| 5,331,944 | 7/1994 | Kujawa et al. | 126/110 R |
| 5,334,231 | 8/1994 | Waterman et al. | 55/493 |
| 5,337,952 | 8/1994 | Thompson | 236/10 |
| 5,340,028 | 8/1994 | Thompson | 236/10 |
| 5,341,656 | 8/1994 | Rust, Jr. et al. | 62/324.6 |
| 5,341,795 | 8/1994 | Chou et al. | 126/110 R |
| 5,341,796 | 8/1994 | Beck et al. | 126/110 R |
| 5,345,924 | 9/1994 | Rieke et al. | 126/110 R |
| 5,346,001 | 9/1994 | Rieke et al. | 165/170 |
| 5,346,002 | 9/1994 | Swilik, Jr. et al. | 165/173 |

*Primary Examiner*—Henry A. Bennett
*Assistant Examiner*—Susanne C. Tinker

[57] ABSTRACT

A multi-poise furnace that is capable of operating in either a vertical or horizontal orientation and having a primary heat exchanger coupled to a condensing heat exchanger, apparatus for collecting and draining condensate leaving the condensing heat exchanger. The collecting apparatus includes a rectangular-shaped collector box connected to an outlet means of the condensing heat exchanger whereby condensate leaving the condensing heat exchanger flows to the lower part of the collector box, and a first drain situated at one corner of the collector box and a second drain situated at another corner of the collector box that is diagonally positioned in relation to the one corner such that one drain is always located in the lower part of the collector box regardless of the furnace orientation, a sheath having at least one drainage slot located around a pressure tap to prevent condensate from blocking the pressure tap, and a plurality of drain diverters for directing condensate originating in the condensing heat exchangers to the center of the collector box.

19 Claims, 5 Drawing Sheets

CONDENSATE HANDLERS FOR MULTI-POISE FURNACE

This application is a continuation-in-part of U.S. patent application Ser. No. 08/180,877 filed Jan. 12, 1994, now abandoned.

BACKGROUND OF THE INVENTION

1. Field of the Invention

This invention relates in general to gas furnaces and, in particular, to the control of condensate within and transitting the collector box in a gas furnace. More specifically, but without restriction to the particular embodiment hereinafter shown and described, this invention relates to features which serve to drain condensate from the collector box, inhibit condensate blockage of pressure taps in the collector box, and reduce the condensate based blockage of condensing heat exchanger outlets into the collecting box.

2. Discussion of the Background Art

Gas furnaces typically include a primary heat exchanger positioned adjacent a burner box containing burners. During operation of the furnace, a blower moves circulating air over the heat exchanger to produce heated air that is then directed to a desired location. Gas is supplied to the burner box by a gas manifold having orifices that direct the gas into the burners. The gas exiting the burners is ignited by an ignitor provided in the burner box. The burners allow combustion of the gas and also direct heated flue gas into the heat exchanger. The typical heat exchanger includes cells with a channel or pass formed in each cell to direct the flow of flue gas produced by combustion. These cells are positioned side by side in a parallel manner and are provided with a predetermined spacing to allow the blower air to flow around the cells. The blower air is thus heated by convection as it circulates over the cells.

A sheet metal panel or cell panel having burner target plates is typically provided to position the burner box relative to the inlet side of the cells contained in the heat exchanger. An inducer having a motor and fan is typically mounted on the discharge side of the heat exchanger. The inducer is activated to induce a flow of flue gas through the heat exchanger and into vent piping so that the flue gas may be vented to a location exterior to the furnace.

A recent advance in the residential heating industry has been the development of condensing gas furnaces. These furnaces typically included a primary heat exchanger as well as a condensing heat exchanger. A blower, in this type of condensing furnace, provides circulating air flow over both heat exchangers to produce heated air that may be directed to a desired location by a system of ducts and registers.

In such condensing furnaces, both the primary heat exchanger and the condensing heat exchanger include cells with a channel or pass formed therein to direct the flow of flue gas produced by combustion. These cells in both the primary and secondary heat exchangers are positioned side by side in a parallel manner and are provided with a predetermined spacing to allow blower air to flow around both groups of heat exchanger cells. Gas is provided to the condensing furnace by a gas manifold having orifices that direct the gas into burners. The burner box is secured to the inlet side of the primary heat exchanger to align the discharge end of the burners with the inlet ports of the primary heat exchanger cells. The gas is ignited by an ignitor as it exits the burners contained in the burner box. The heated flue gas produced by combustion is then directed into the primary heat exchanger cells.

The condensing heat exchanger of the furnace is configured in a manner similar to that of the primary heat exchanger. A series of side by side condensing cells is provided, each of which has an inlet port for receiving flue gas discharged from the primary heat exchanger. The inlet ports of the condensing heat exchanger cells are aligned and secured in a sheet metal panel forming the inlet side of the condensing heat exchanger. The inlet side of the condensing heat exchanger is fluidly connected to the discharge side of the primary heat exchanger by a coupling box. The condensing cells function to exchange heat with the clean circulation air and to condense water vapor out of the products of combustion contained in the flue gas. This condensate drains from the condensing cells into a collector box provided on the discharge side of the condensing heat exchanger. The collector box extends through the cell panel below the burner box and includes tubing to further drain the condensate from the box into drain piping. The collector box is provided with an opening to which the intake side of an inducer is fluidly secured. The inducer in the condensing furnace induces the flow of heated flue gas through the cells in both the primary and condensing heat exchangers.

The collector box also contains a pressure tap located therein which serves to detect negative pressure which indicates normal inducer motor operation or excess fluid collecting in the box during abnormal furnace operation. This condition, which is intended to indicate a blocked drain or other problem, will result in furnace shutdown. If condensate blocks the opening to the pressure tap, the system may respond as if excess fluid is collecting. This is an undesirable result as it can lead to excess furnace cycling or even total shutdown necessitating a service call.

With recent advancements in the art, a commercially feasible condensing gas furnace having four possible installation orientations has been proposed by the assignee of the present invention. Such gas-fired furnaces are known in the art as multi-poise condensing furnaces and are disclosed, for example, in the copending, commonly assigned U.S. patent application Ser. No. 08/089697, entitled "Multi-Poised Condensing Furnace", and in U. S. Pat. No. 5,309,890 to Rieke et al., U. S. Pat. No. 5,331,944 to Kujawa et al., U. S. Pat. No. 5,341,795 to Chou et al., U.S. Pat. No. 5,320,087 to Froman, U.S. Pat. No. 5,346,002 to Swilik, Jr. et al., U.S. Pat. No. 5,346,001 to Rieke et al., and U.S. Pat. No. 5,345,924 to Rieke et al. all assigned to the present assignee. The teachings of U.S. patent application Ser. No. 08/089697, and U. S. Pat. Nos. 5,309,890, 5,331,944, 5,341,795, 5,320,087, 5,346,002, 5,346,001, and 5,345,924 are all incorporated by reference as to their teachings of the construction and function of a multi-poise furnace.

These multi-poise furnaces are installable so that the circulating air that is being heated moves through the furnace in either an upflow, downflow, horizontal-right flow, or horizontal-left flow direction. The multi-positional properties of these furnaces results in a requirement for design features which will allow the furnace to function properly and just as efficiently in any one of these four possible installation orientations. In the prior art, for example, the pressure tap inside the collector box was protected from condensate by mitering the tap at about 45° so that the upper portion overhung the lower. This device cannot be used in a multi-poise furnace as it would not be effective in different orientations.

SUMMARY OF THE INVENTION

It is therefore a primary object of the present invention to provide condensate control for the collector box in a condensing type furnace that may be installed in any one of the upflow, downflow, and horizontal orientations.

It is a further object of this invention to provide an apparatus to prevent condensate from blocking the pressure tap of the collector box in a condensing type furnace that may be installed in any one of the upflow, downflow, and horizontal orientations.

It is still a further object of this invention to provide an apparatus which provides optimal drainage from the collector box in a condensing type furnace that may be installed in any one of the upflow, downflow, and horizontal orientations.

It is yet a further object of this invention to provide an apparatus to reduce or eliminate the blockage by condensate of heat exchanger outlets into the collector box in a condensing type furnace that may be installed in any one of the upflow, downflow, and horizontal orientations.

These and other objects of the present invention are attained by a multi-poise furnace that is capable of operating in either a vertical or horizontal orientation and having a primary heat exchanger coupled to a condensing heat exchanger, apparatus for collecting and draining condensate leaving the condensing heat exchanger. The collecting apparatus includes a rectangular-shaped collector box connected to an outlet means of the condensing heat exchanger whereby condensate leaving the condensing heat exchanger flows to the lower part of the collector box, and a first drain situated at one corner of the collector box and a second drain situated at another corner of the collector box that is diagonally positioned in relation to the one corner such that one drain is always located in the lower part of the collector box regardless of the furnace orientation. It also includes a sheath having at least one drainage slot located around a pressure tap to prevent condensate from blocking the pressure tap and a plurality of drain diverters for directing condensate originating in the condensing heat exchangers to the center of the collector box.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 7:
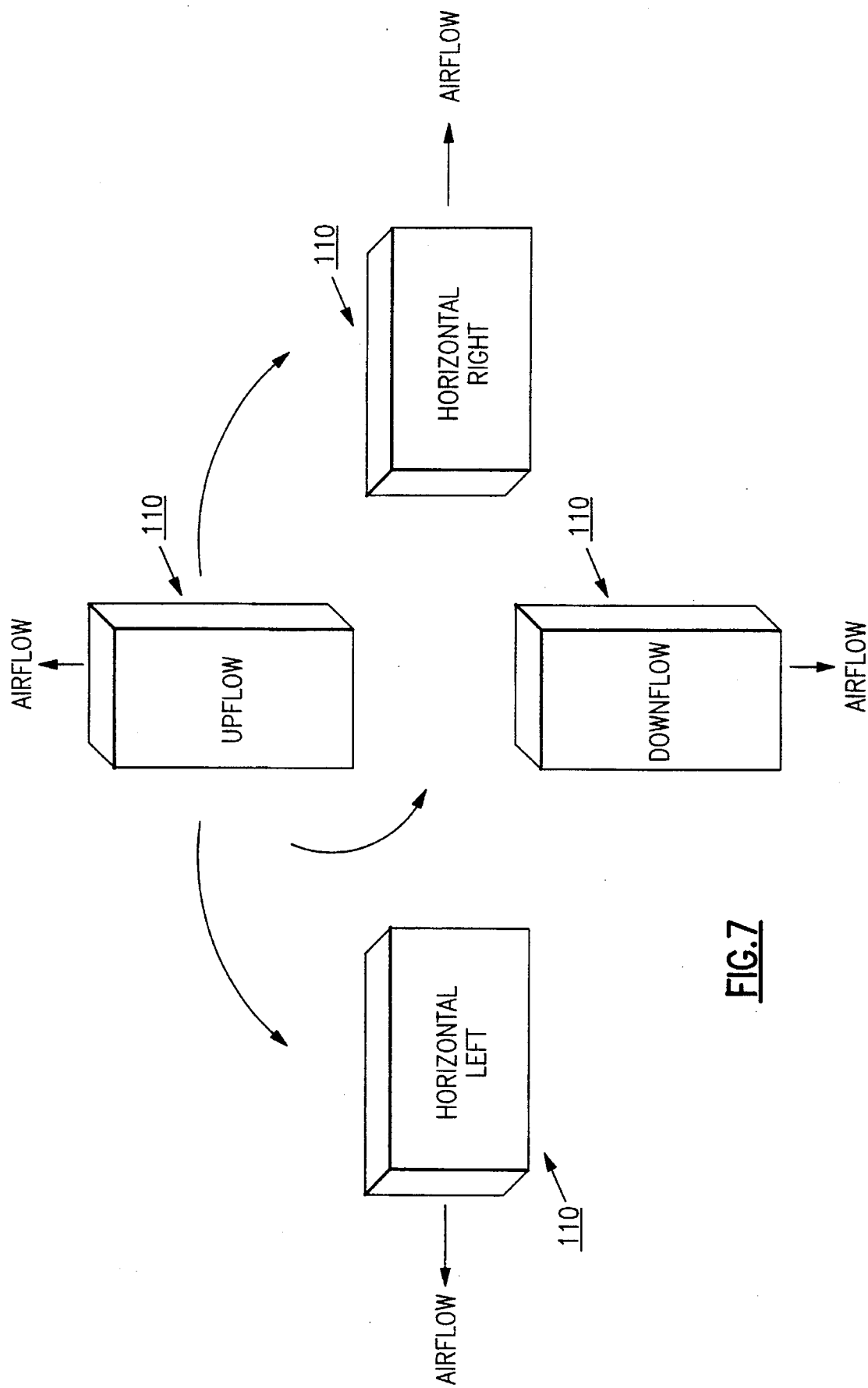
FIG. 7 is a diagrammatic view showing the present furnace orientated in its four operable positions.
Figure 8:
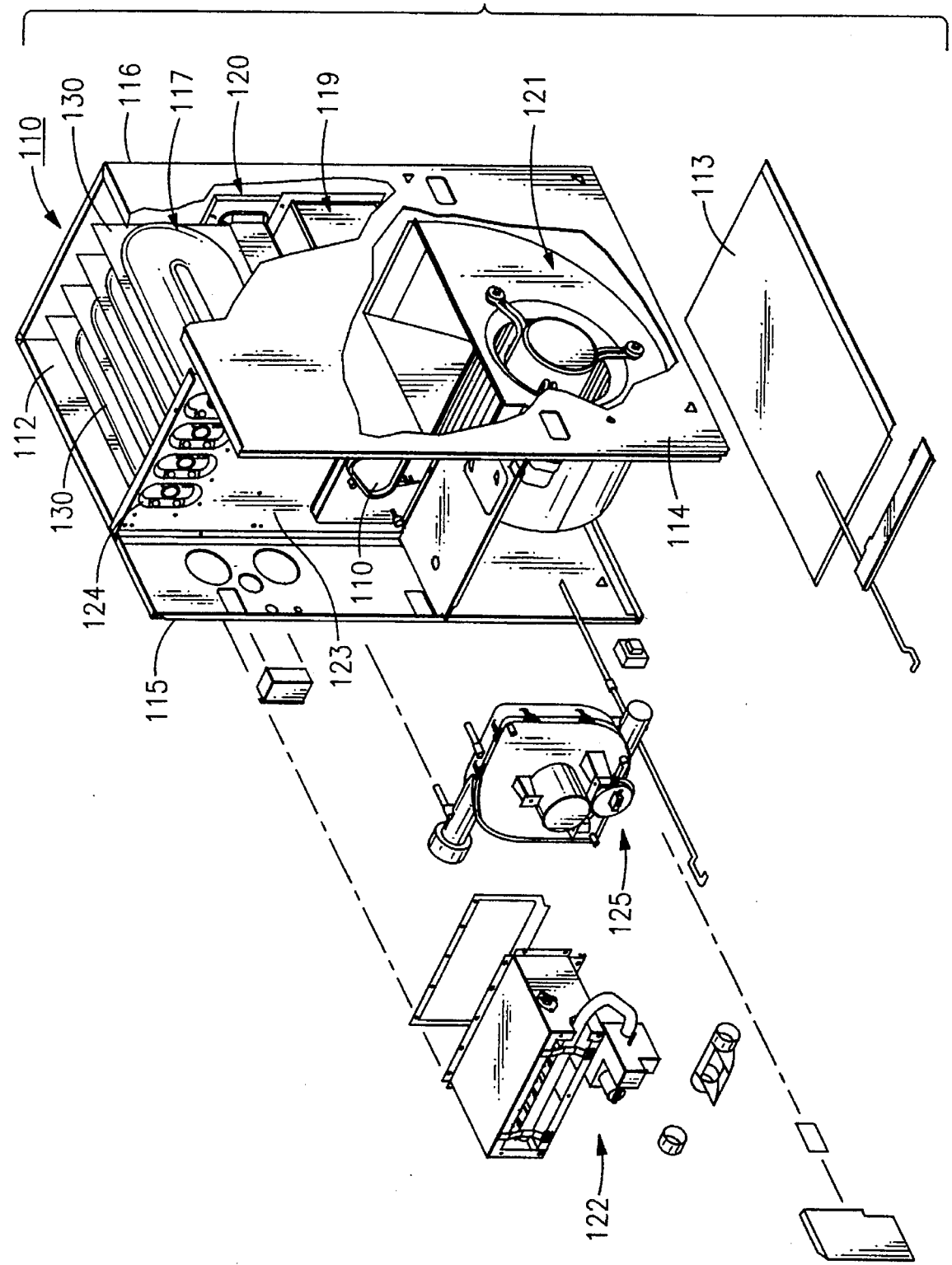
FIG. 8 is an exploded view showing the major components of the present furnace.

Turning now to the Drawing and particularly, FIGS. 7–8 thereof, there is depicted a multi-poise condensing furnace, generally referenced 110, that is housed within a compact, rectangular-shaped enclosure 111. The furnace is shown in an upflow orientation wherein return air from a comfort zone is drawn into the furnace through a bottom opening and passed upwardly through return air duct 112 and discharged via an opening in the top wall of the unit.

Although not shown, the furnace is configured so that a return air entrance can be selectively located in the bottom wall 113 of the housing or in either one of the two side walls 114 and 115. A primary heat exchanger 117, is mounted in the supply air duct at the top of the furnace adjacent to the top wall opening.

The terms top and bottom, and other relative terms used herein, describe various components or regions of the furnace when the unit is placed in an upflow orientation as shown in FIG. 8. It should be clear, however, that the furnace can be placed in a number of different orientations as illustrated in FIG. 7. These include the upflow orientation illustrated in FIG. 8 wherein the supply air is discharged from the furnace in an upward direction and a downflow orientation wherein the furnace is inverted to discharge the supply air in a downward direction. In addition, the furnace may also be tipped ninety degrees out of the upflow orientation to provide either a horizontal left or a horizontal right supply air discharge.

The major operational components of the furnace are shown in the exploded view of FIG. 7. They include, in addition to the primary heat exchanger 117, a secondary condensing heat exchanger 119 connected to the primary heat exchanger by a flue gas manifold. Fluid or condensate leaving the condensing heat exchanger 119 is collected in collector apparatus, generally denominated 110, the exterior of which is shown in FIG. 8. After collecting in the collector apparatus 110 fluid is drained from the system as will be discussed hereinafter. The condensing heat exchanger 119, along with other component parts of the furnace, including collector box 10 must operate effectively in any of the above-noted orientations. The collector box 10 is connected to the outlet 70 (see FIG. 4) of the condensing heat exchanger 119. Fluid leaving the condensing heat exchanger 119 thus condenses at the lower part of the collector box 10. Because the furnace may be in any one of four possible orientations, any one four surfaces may in actuality become the bottom of collector box 10.

The manifold conducts flue gas products from the outlet of the primary unit to the inlet of the secondary unit. A return air fan 121 is mounted in the bottom of the furnace and forces return air drawn from a comfort zone through the return air duct 112 whereby the return air is passed sequentially over the heat transfer surfaces of the secondary unit and then over the heat transfer surfaces of the primary unit. A burner assembly 122 is attached to the vertical interior panel 123 in front of the entry ports 124 to each of the parallel primary heat exchanger stages 130—130. The burner assembly contains a separate burner for servicing each stage which is adapted to inject high temperature flue gas products directly into the entrance of an associated heat exchanger stage.

The condensing heat exchanger 119 functions to exchange heat with the clean circulation air and to condense water vapor out of the products of combustion contained in the flue gas. This condensate drains from the condensing cells into a rectangular-shaped collector box 10 provided on the discharge side of the condensing heat exchanger. The collector box extends through the cell panel below the burner box and includes tubing to further drain the condensate from the box into drain piping. The collector box 110 is provided with an opening to which the intake side of an inducer is fluidly secured. The inducer in the condensing furnace induces the flow of heated flue gas through the cells in both the primary 117 and condensing 119 heat exchangers.

An inducer unit 125 is also secured to the vertical panel 123 and is operatively attached to the collector box 10 attached to the discharge side of the secondary heat exchanger 119. The inducer functions to pull flue gas products through the two heat exchangers and discharge the products to one or the other side of the furnace, depending upon the furnace's orientation. A removable front panel (not shown) is used to enclose the burner assembly, the inducer 125 and return air fan.

Figure 1:
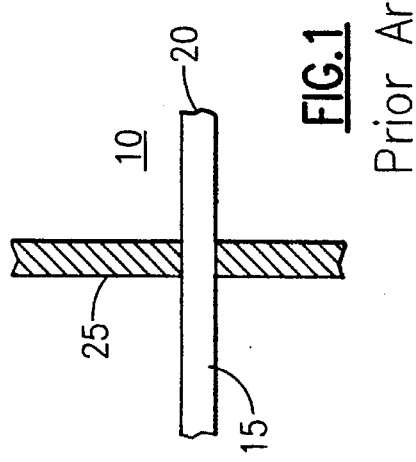
FIG. 1 is a side view of the prior art apparatus for prevention of condensate blockage of the pressure tap of a collector box.

In FIG. 1 there can be seen the prior art pressure tap 15 apparatus located inside the collector box 10. The pressure tap 15 extends inwardly into collector box 10 through side wall 25. In the prior art the pressure tap 15 was protected from condensate by having a mitered section 20 cut to an angle of about 45°, resulting in the upper portion of the pressure tap terminus overhanging the lower portion thereof. Thus any condensate that accumulated would drip down from the overhang and not block the pressure tap 15 to give false indications that the liquid level inside collector box 10 was excessively high. This device, while adequate for prior art furnaces, will not function appropriately in a multi-poise furnace which is capable of being used in any of the upflow, downflow, horizontal-right flow, or horizontal-left flow orientations. It can be clearly seen that in a downflow position the mitered pressure tap would have an even greater tendency to accumulate condensate in the overly long lower section, thus defeating the purpose of the mitering.

Figure 3:
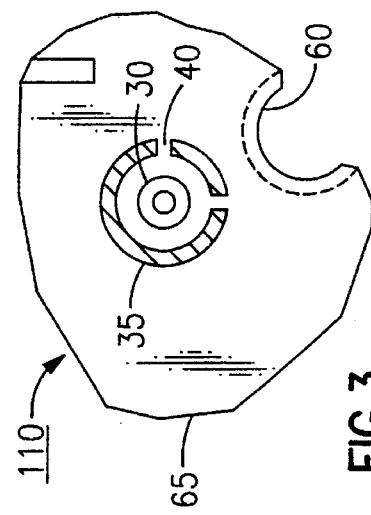
FIG. 3 is a cross sectional view of the invention of FIG. 2.
Figure 2:
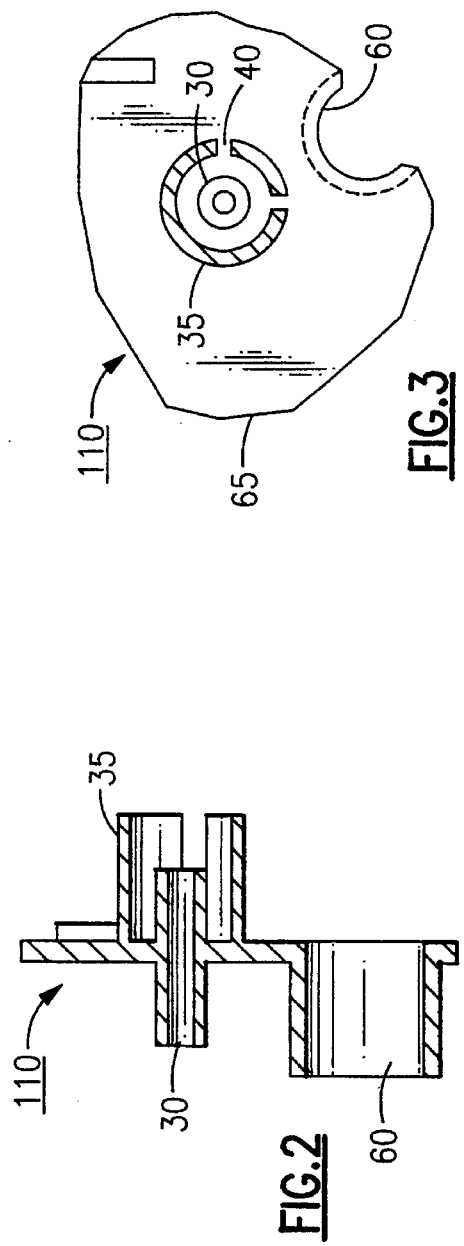
FIG. 2 is a side view of the protective hood of the instant invention.

FIGS. 2 and 3 show the preferred embodiment of the apparatus for preventing condensate based blockage of the pressure tap 30 which protrudes through side wall 65 into the interior of the collector box 10. Surrounding the pressure tap 30, which detects the accumulation of fluid as a problem condition to result in shut down of the furnace, is hood or sheath 35. The pressure tap 30 is recessed within the sheath 35 so that condensate will tended to accumulate, if at all, in the sheath portion that extends beyond pressure tap 30. Condensate will then drain from either one or both drains 40 40 in the sheath, depending upon in which of the four possible orientations the furnace is installed. After draining into the collector box 10 the liquid will then pass out of the collector box 10 through one of the exit drain holes 60.

Figure 4:
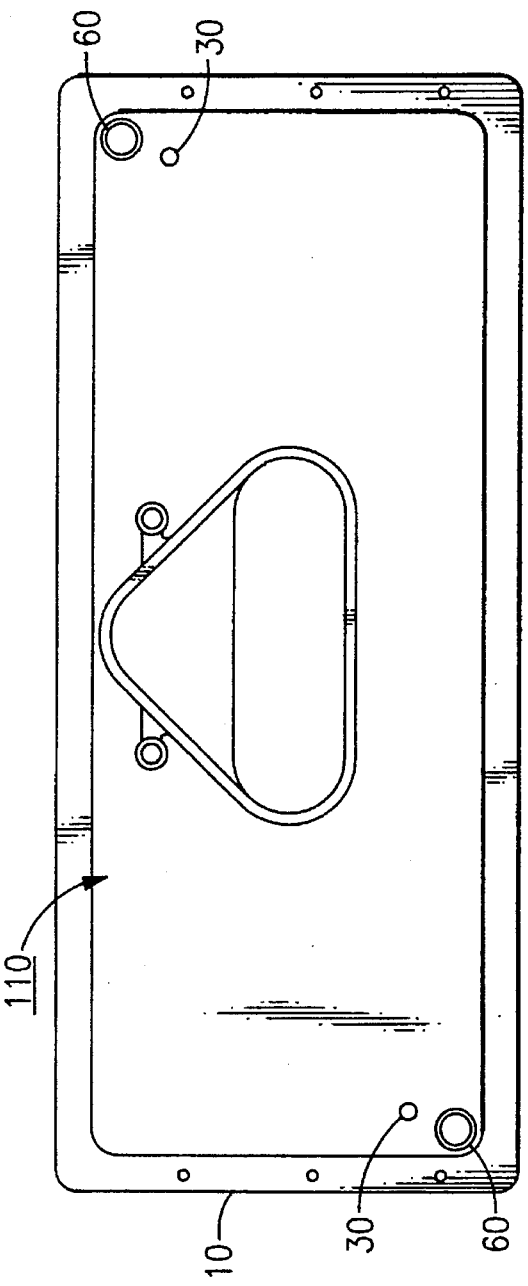
FIG. 4 is a front elevational view of the instant invention showing the collector box and the two drains leading therefrom.

Referring now to FIG. 4 there is shown the preferred embodiment for collector box 10 draining, wherein two drain holes 60 60 are located adjacent diagonally opposite corners of the collector box 10 so that condensate may drain fully out of an appropriately placed drain irrespective of whether installation is in the upflow, downflow, horizontal right-flow or horizontal left-flow orientation. The positioning of the two drain holes 60 60 of the instant invention on diagonally opposite corners, provides the best possible situation in that a drain hole 60 is found at or near the bottom of the collector box 10 in every one of the expected configurations rather than partially up a side wall. This is accomplished using only two drain holes 60 60 rather than four as would occur if there was a drain hole on the bottom surface for each orientation, thereby simplifying the manufacture and assembly of the furnace.

Figure 5:
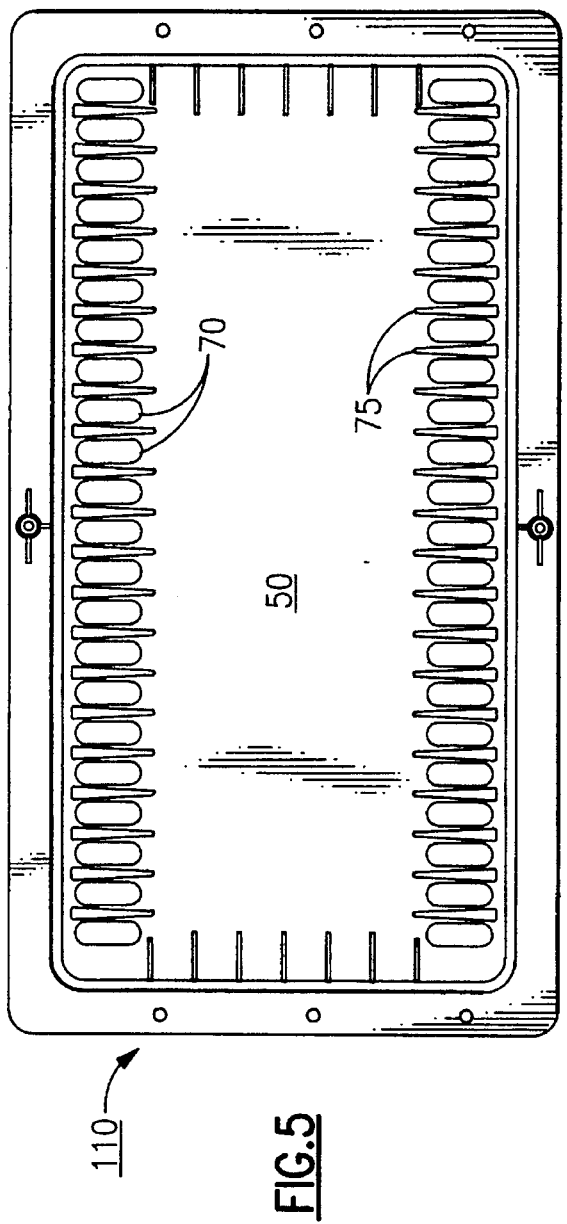
FIG. 5 is a front elevational view of the collector box cell panel of the instant invention.
Figure 6:
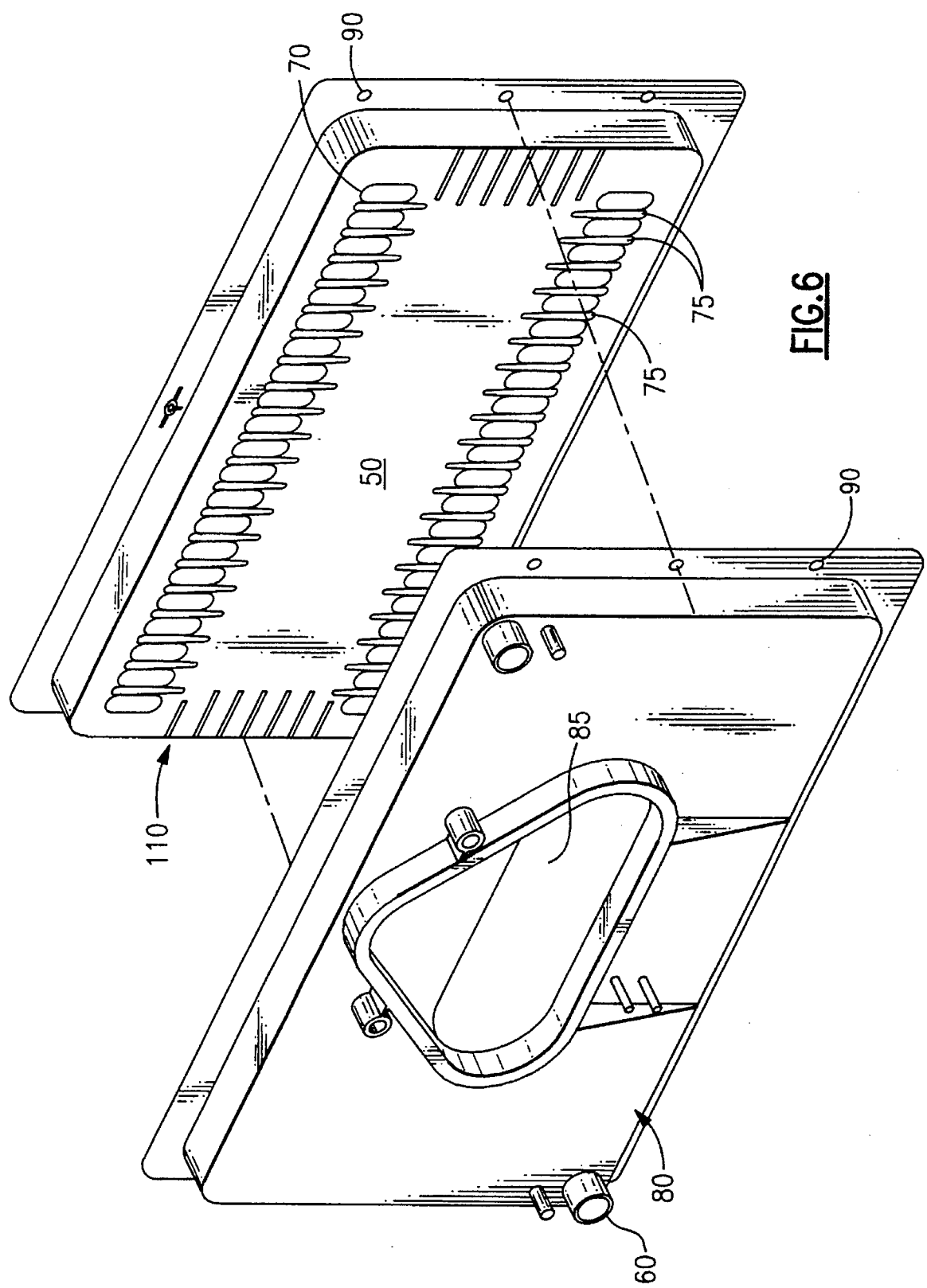
FIG. 6 is an exploded perspective view of the collector box and cell panel of FIG. 5.

Referring now to FIGS. 5 and 6 the preferred embodiment of the final portion of the apparatus for condensate control with respect to the collector box 10 is seen. When the multi-poise furnace is installed in a horizontal position, condensate runs from the condensing heat exchangers 119 that are at a higher level in that orientation, downward and may thus block the condensing heat exchangers 119 that are situated at a lower level in that orientation. This blockage can have an adverse effect on the performance of the system.

Blockage is eliminated or reduced by means of collector plate 50 which is attached to the inlet side 80 of the collector box via matching holes 90. On collector plate 50 condensing heat exchanger outlets 70 70 alternate in two parallel rows, each along one edge with drain diverters 75 75. Each drain diverter 75 is essentially triangular in shape, and protrudes forward from the plane of the collector plate 50, presenting to the flowing condensate raised sides which slope toward the center of the collector box and inlet 85. Looking at FIG. 6 it can been seen that condensate passing through any given heat exchanger outlet 70 will be diverted to pass along the long side of the triangular shaped drain diverter 75 immediately below it and this will be channeled to the center of the collector box, rather than flowing directly down to clog the lower heat exchanger outlet. The drain diverters 75 75 are symmetrical with respect to the horizontal plane when the furnace is in the horizontal left-flow or horizontal right-flow position, the diversion will occur in either of these orientations.

While this invention has been explained with reference to the structure disclosed herein, it is not confined to the details set forth and this application is intended to cover any modifications and changes as may come within the scope of the following claims:

What is claimed is:

1. In a multi-poise furnace that is capable of operating in either a vertical or horizontal orientation and having a primary heat exchanger coupled to a condensing heat exchanger, apparatus for collecting and draining condensate leaving the condensing heat exchanger that includes:

a rectangular-shaped collector box connected to outlet means of said condensing heat exchanger whereby condensate leaving the condensing heat exchanger flows to a lower part of the collector box, and a first drain means situated at a first corner of said collector box and a second drain means situated at a second corner of said collector box, said second corner being diagonally positioned in relation to said first corner such that one drain means is always located in said lower part of the collector box regardless of the furnace orientation.

2. The apparatus according to claim 1 that includes a pressure sensor means that is mounted adjacent to each drain means so that the sensor means is at a higher elevation than the adjacent drain means when said adjacent drain means is positioned in said lower part of the collector box.

3. The apparatus according to claim 2 wherein each sensor means extends into the interior of said collector box and further includes a sheath means surrounding the extended portion of each sensor means to protect the sensor means from condensate falling under the influence of gravity from the outlet means of said condensing heat exchanger.

4. The apparatus according to claim 3 wherein each sheath means has slotted openings therein such that one of said openings faces a lowest part of the collector box when the furnace is orientated in either a vertical or a horizontal orientation.

5. The apparatus according to claim 1 that further includes channeling means adjacent to the condensing heat exchanger outlet means that protrudes into the interior of said box for directing condensate falling from the outlet means away from said outlet means regardless of the furnace orientation.

6. In a multi-poise furnace that is capable of operating in either a vertical or horizontal orientation and having a primary heat exchanger coupled to a condensing heat exchanger, apparatus for collecting and draining condensate leaving the condensing heat exchanger that includes:

- a rectangular-shaped collector box connected to outlet means of said condensing heat exchanger whereby condensate leaving the condensing heat exchanger flows to [the]_a drain in a lower part of the collector box,
- a pressure tap mounted adjacent to said drain so that the pressure tap is at a higher elevation than said drain, and
- sheath means, said sheath means having at least one drainage slot therein, said sheath means being located around said pressure tap to prevent condensate from blocking said pressure tap.

7. The apparatus according to claim 6 wherein said sheath means is cylindrical.

8. The apparatus according to claim 6 wherein said sheath means contains two drainage slots.

9. The apparatus according to claim 6 wherein said pressure tap is recessed within said sheath means.

10. The apparatus according to claim 6 that includes a first drain means situated at a first corner of said collector box and a second drain means situated at a second corner of said collector box, said second corner being diagonally positioned in relation to said first corner such that one drain means is always located in a lower part of the collector box regardless of the furnace orientation.

11. The apparatus according to claim 10 further comprising channeling means for directing condensate originating in condensing heat exchangers of the furnace to a center of the collector box, thereby reducing condensate blockage of outlets of said heat exchanger.

12. In a multi-poise furnace that is capable of operating in either a vertical or horizontal orientation and having a primary heat exchanger coupled to a condensing heat exchanger, apparatus for collecting and draining condensate leaving the condensing heat exchanger that includes:

- a rectangular-shaped collector box connected to outlet means of said condensing heat exchanger whereby condensate leaving the condensing heat exchanger flows to a lower part of the collector box, and
- channeling means for directing condensate originating in condensing heat exchangers of the furnace to a center of the collector box, thereby reducing condensate blockage of outlets of said heat exchanger.

13. The apparatus according to claim 12 wherein said channeling means comprises a plurality of drain diverters.

14. The apparatus according to claim 13 wherein said drain diverters, alternating with condensing heat exchanger outlets are located on a collector plate that, together with a collector box cover, forms a wall of said collector box.

15. The apparatus according to claim 14 wherein said drain diverters have raised sides which symmetrically slope toward a center of said collector box.

16. The apparatus according to claim 15 wherein said drain diverters are shaped as elongated triangles.

17. The apparatus according to claim 15 wherein said drain diverters and heat exchanger outlets are located adjacent parallel sides of said collector plate.

18. The apparatus according to claim 12 that includes a pressure tap in said lower part of the collector box and sheath means, said sheath means having at least one drainage slot therein, said sheath means being located around said pressure tap to prevent condensate from blocking said pressure tap.

19. The apparatus according to claim 18 that further includes a first drain means situated at a first corner of said collector box and a second drain means situated at a second corner of said collector box, said second corner being diagonally positioned in relation to said first corner such that one drain means is always located in the lower part of the collector box regardless of the furnace orientation.

* * * * *